(12) United States Patent
Hoyt et al.

(10) Patent No.: US 7,859,153 B2
(45) Date of Patent: Dec. 28, 2010

(54) DEVICE AND METHOD FOR MOUNTING ELECTRIC MOTOR STATORS

(75) Inventors: Robert A. Hoyt, Bristol, CT (US); David A. Curtis, Torrington, CT (US)

(73) Assignee: The Bergquist Torrington Company, Torrington, CT (US)

(*) Notice: Subject to any disclaimer, the term of this patent is extended or adjusted under 35 U.S.C. 154(b) by 277 days.

(21) Appl. No.: 12/259,180

(22) Filed: Oct. 27, 2008

(65) Prior Publication Data
US 2009/0134725 A1 May 28, 2009

Related U.S. Application Data

(60) Provisional application No. 61/000,460, filed on Oct. 26, 2007.

(51) Int. Cl.
H02K 5/00 (2006.01)
H02K 15/04 (2006.01)

(52) U.S. Cl. .................. 310/89; 310/254.1; 29/596

(58) Field of Classification Search .................. 310/89, 310/91, 418, 406, 254.1; 29/596–598
See application file for complete search history.

(56) References Cited

U.S. PATENT DOCUMENTS

| 4,619,434 A | 10/1986 | Snyder et al. |
| 5,313,125 A | 5/1994 | Bosman et al. |
| 5,704,717 A | 1/1998 | Coachimin |
| 6,232,687 B1 | 5/2001 | Hollenbeck et al. |
| 6,481,050 B1 * | 11/2002 | Wilson et al. .................. 15/413 |
| 2006/0055176 A1 | 3/2006 | Dupont et al. |
| 2006/0223435 A1 | 10/2006 | Herbst |
| 2007/0120368 A1 | 5/2007 | Baarman et al. |
| 2007/0278979 A1 * | 12/2007 | Hashimoto et al. .......... 318/538 |

* cited by examiner

*Primary Examiner*—Quyen Leung
*Assistant Examiner*—Leda Pham
(74) *Attorney, Agent, or Firm*—Haugen Law Firm PLLP; Frederick W. Niebuhr

(57) ABSTRACT

A motor stator mounting device includes a plastic motor housing having a cylindrical housing section for receiving the stator. Longitudinal ribs along an inside surface of the housing section are inclined to converge gradually in a distal direction, thus tending to center a stator inserted distally into the housing section. An annular stator retaining member includes a plurality of distally extending centering features. Outside surfaces of the centering features interact with an interior surface of the housing section to center the retaining member as it is inserted distally. Inside surfaces of the centering features interact with a proximal region of a previously inserted stator, such that distal insertion of the retaining member both axially positions and radially centers the stator relative to the cylindrical housing. The retaining member is secured to the housing with a series of sonic welds to positionally fix the stator inside the housing.

19 Claims, 13 Drawing Sheets

DEVICE AND METHOD FOR MOUNTING ELECTRIC MOTOR STATORS

This application claims the benefit of priority based on Provisional Application No. 61/000,460 entitled "Centering and Retaining Method for Low Cost Manufacturing of Electric Motor Stators," filed Oct. 26, 2007.

BACKGROUND OF THE INVENTION

The present invention relates to electric motors, and more particularly to the assembly of stators and other components of electric motors into housings designed to contain and positionally locate the motor components.

A wide variety of electrical products include internal components that generate significant amounts of heat during normal use. Prominent examples include personal computers, and components of computer systems such as servers and work stations. Frequently these devices incorporate electric motor driven fans, preferably contained in aerodynamically designed housings to more effectively move air across heat generating components and exhaust the heated air to maintain a satisfactory operating temperature. Given the strong consumer and user preferences for lower cost and smaller size, manufacturers are continually challenged to provide smaller yet equally reliable fans and motors while decreasing manufacturing costs. To this end, some manufacturers have introduced plastic housings to augment or replace previously used metal housings for the motor components. Although this has the potential to significantly reduce costs, the approach increases the difficulty of reliably securing the motor stator against axial and rotational movement.

One of these concerns arises due to the interface between the cylindrical stator body, i.e. the lamination stack, and the slight incline or truncated conical shape of an otherwise cylindrical plastic housing, present due to the slight draft angle required when molding the plastic part. One approach to this problem involves fixturing the stator and securing the stator with potting compound or glue. Other designs employ screws or other fasteners to retain the stator. These approaches require added time and labor, and raise process control difficulties in terms of repeatable, consistent stator positioning. Alternatively, a motor already secured within a metal casing can be mounted within a plastic housing. This entails unwanted redundancy and adds to the cost.

Therefore, the present invention has several aspects directed to one or more of the following objects:
  (i) to provide a stator mounting device with a stator housing and stator retainer configured to inherently guide a stator towards centering as it is inserted into and secured within the housing;
  (ii) to provide a stator containment and fixation device that requires no auxiliary fasteners or fixturing of the stator;
  (iii) to provide a process for assembling a motor stator into a motor housing that requires less time and labor yet affords a more reliable and consistent positioning of the stator; and
  (iv) to provide an improved aerodynamic configuration of a housing containing and positioning electric motor components.

SUMMARY OF THE INVENTION

To achieve these and other objects, there is provided a motor stator mounting device. The device includes a motor housing disposed about a longitudinal housing axis. The housing includes a cylindrical housing section centered on the housing axis and having a proximal end, a distal end, and an interior surface region between the proximal and distal ends. The surface region is inclined to gradually converge in a distal direction. The housing further includes a transversely oriented distal end housing section integral with the cylindrical housing section. The device includes a stator retaining member having an annular platform centered on a retainer axis. A stator centering component is disposed circumferentially about the platform, extending away from the platform in a selected direction parallel to the retainer axis, and tapered to provide a decreasing radial thickness in the selected direction. The proximal end is open to receive a cylindrical motor stator for a distal insertion into the cylindrical housing section toward a selected axial location in which a distal end of the stator engages the distal end housing section. The interior surface region is adapted to engage the stator during the distal insertion and urge a distal end region of the stator radially toward a centering about the housing axis responsive to the distal insertion, thus to substantially center the stator distal end region within the housing. The stator retaining member is insertable distally into the cylindrical housing following the distal insertion of the stator, with the retainer and housing axes substantially coincident and with the centering component directed distally of the platform, to locate the centering component radially between the interior surface region and an exterior surface region of the stator near a proximal end thereof. Movement of the retaining member distally toward a stator retaining position produces a wedging action of the centering component against said interior and exterior surface regions, tending to center the proximal end of the stator on the housing axis while positioning the stator at the selected axial location. The stator retaining member is adapted for an attachment to the housing while in the retaining position, to permanently fix the stator.

Preferably the cylindrical housing section comprises a tubular wall and a plurality of ribs extending longitudinally along the inside surface of the tubular wall, with the interior surface region comprising radially inward surfaces of the ribs. In such cases the retaining member can comprise a plurality of recesses arranged peripherally about the platform. Each recess is adapted to accommodate one of the ribs, to determine a desired angular positioning of a retaining member with respect to the cylindrical housing section.

The centering component can comprise a plurality of centering features arranged circumferentially about the platform in spaced apart relation. Each centering feature extends away from the platform in the selected direction. In this arrangement, as the retaining member is inserted, centering features can undergo elastic deprivation individually, minimizing any unwanted impact of such deprivation on neighboring centering features or other portions of the retaining member.

Another aspect of the present invention is a process for assembling a motor stator into a motor housing. The process includes:
  (a) providing a motor housing comprising a cylindrical housing section disposed about a longitudinal housing axis, open at a proximal end thereof and having a transversely oriented housing end section at a distal end thereof, wherein an interior surface region between the proximal and distal ends is inclined to converge gradually in the distal direction;
  (b) inserting a cylindrical motor stator into the cylindrical housing section through the open end and moving the stator distally toward the distal end section to effect a sliding surface engagement of a distal end region of the stator with the interior surface region;
  (c) after effecting said engagement, moving the stator distally toward a selected axial location in contact with the distal end section while said sliding surface engagement tends to center the distal end region of the stator about the housing axis;

(d) with the stator at the selected axial location, moving a stator retaining member distally into a stator retaining position with a distally converging centering component of the retaining member disposed radially between the interior surface and an exterior surface of a proximal end region of the stator, to substantially center the proximal end region on the housing axis;

(e) and with the retaining member in the stator retaining position, fixing the retaining member to the cylindrical housing section to positionally fix the stator.

In preferred versions of the process, bonding the exterior and interior surface regions comprises forming a plurality of sonic welds at selected locations where the exterior surface region is in surface contact with the interior surface region. The resulting fusion bonds positively secure the retaining member to positively secure the stator, without the need for screws or other auxiliary fasteners. This not only eliminates the cost of the extra fasteners and time to install them, but also eliminates any discontinuities to or interruptions in the smooth outer profile of the housing section. This reduces turbulence for more efficient flow of air through the passage between concentric cylindrical housing sections.

IN THE DRAWINGS

For a further understanding of the above and other features, reference is made to the following detailed description and to the drawings, in which.

DETAILED DESCRIPTION OF THE PREFERRED EMBODIMENTS

Figure 1:
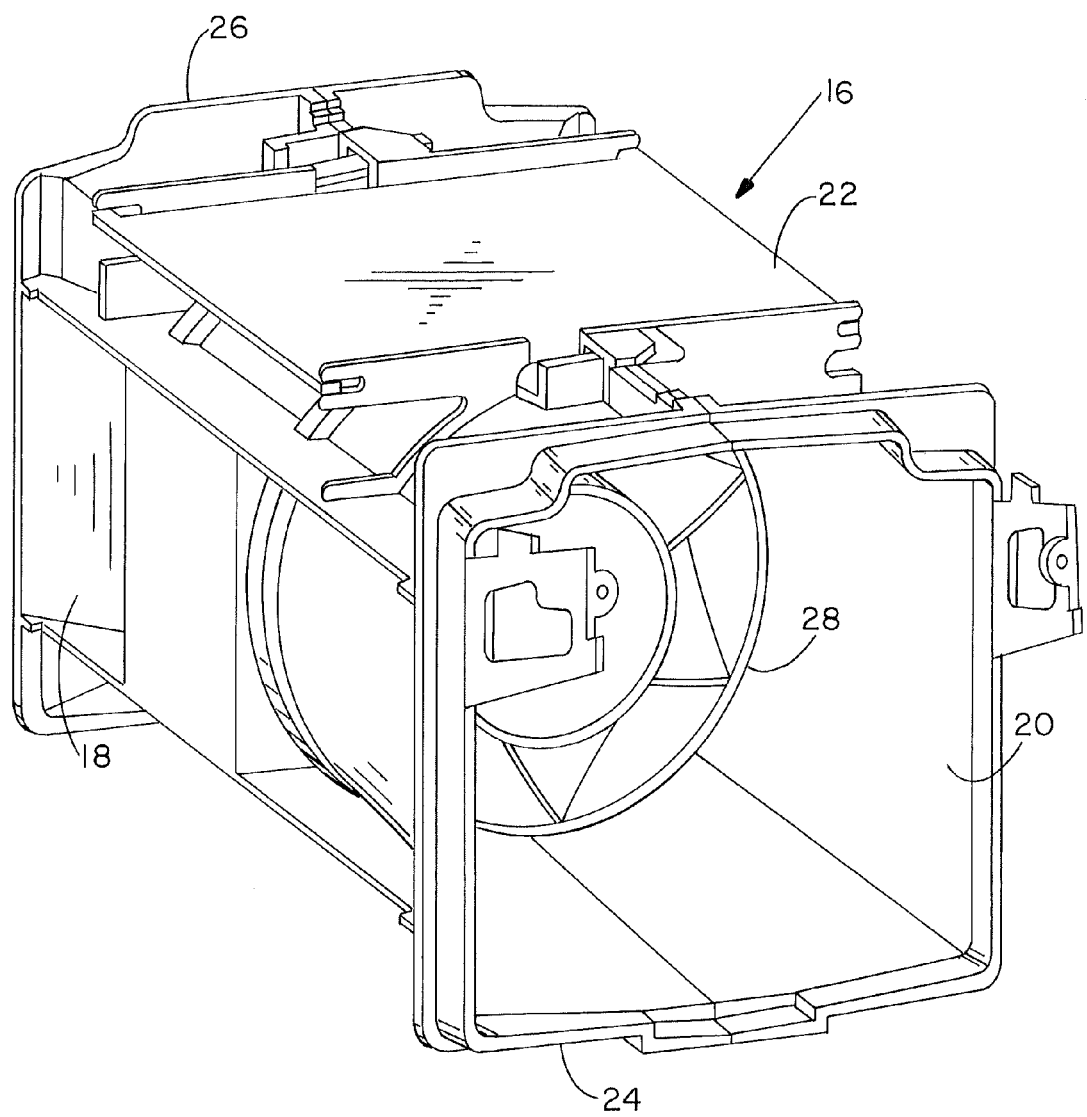
FIG. 1 is a perspective view of a clamshell assembly incorporating a motor housing constructed in accordance with the present invention.

Turning now to the drawings, there is shown in FIG. 1 a clamshell assembly 16 used to mount a system for circulating cooling air through a computer work station or other electrical product incorporating heat generating components. Clamshell assembly 16 is adapted to be mounted inside a casing of the product (not shown) and houses a fan driven by an electrically commutated motor to circulate the air through the casing. An outer casing or clamshell of assembly 16 includes confronting, opposite side clamshell sections 18 and 20. A printed circuit board 22 including electrical components is mounted directly above the clamshell sections. The clamshell is open at forward and rearward end regions 24 and 26, and converges inwardly from both of the end regions. A motor housing 28 is mounted along a medial region of the clamshell.

Figure 2:
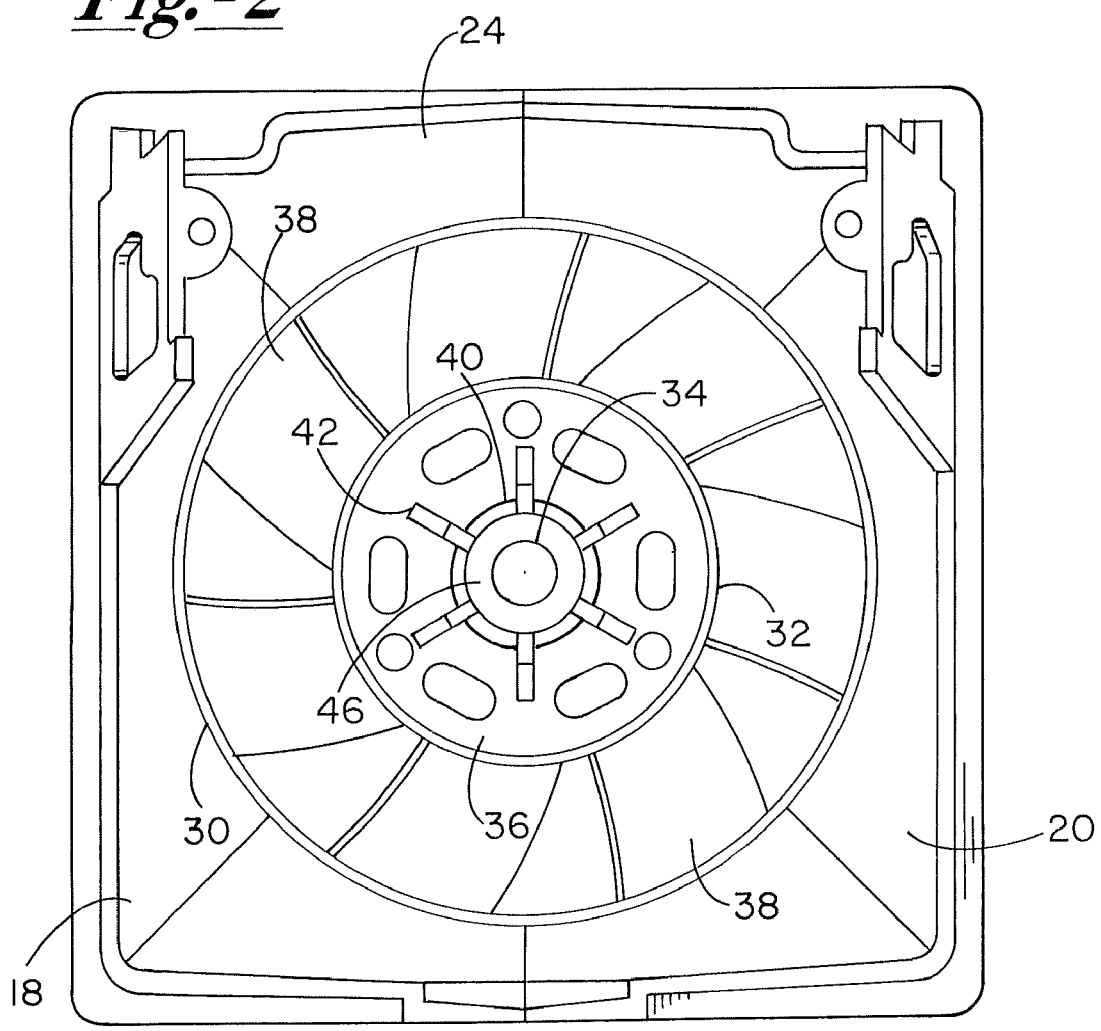
FIG. 2 is a frontal elevation of the clamshell assembly.

As seen in FIG. 2, frontal regions of clamshell sections 18 and 20 converge radially toward contact with motor housing 28, preferably through an elastic ring surrounding the motor housing to dampen vibrations. As a result, air flowing through the clamshell flows through motor housing 28, primarily along an annular space between an outer cylindrical housing section 30 and an inner cylindrical housing section 32, both of which are centered on a longitudinal housing axis. An elongate rotor shaft 34 of the motor likewise is centered on the housing axis.

Figure 4:
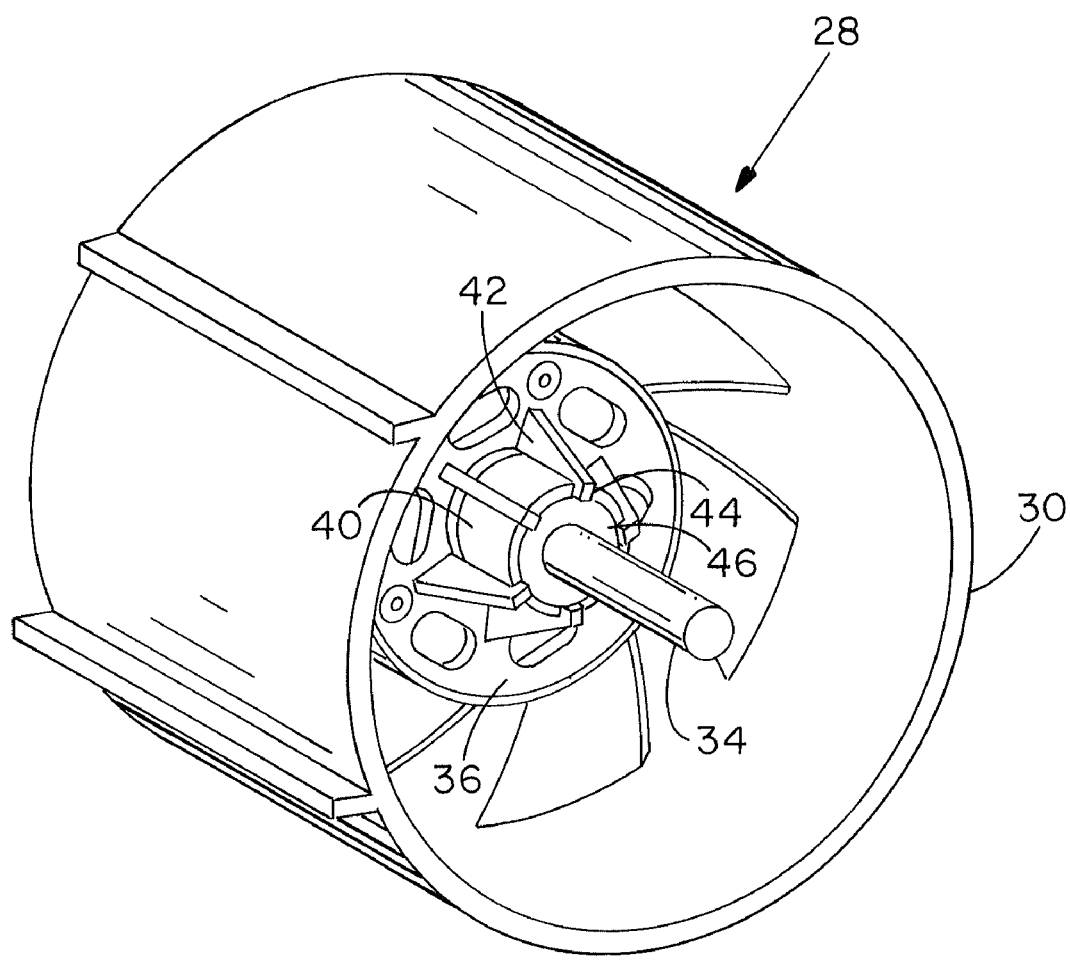
FIG. 4 is a perspective view of a housing and motor components separate from the clamshell.

With reference to FIG. 4 along with FIG. 2, inner cylindrical housing section 32 includes a forward or distal end section 36 disposed transversely relative to the housing axis. A series of vanes 38 are joined to housing sections 30 and 32 to integrally couple the housing sections. Vanes 38 preferably are slanted, curved, or otherwise configured for improved air flow through the passage between the housing sections. Distal end section 36 includes a centrally disposed distally extending sleeve 40. Six fixture elements 42 are uniformly spaced about sleeve 40, with each fixture element including a free end 44 extending radially into the opening formed by the sleeve. Elements 42 cooperate to provide a fixture or bearing seat to axially contain a bearing 46 that surrounds rotor shaft 34.

Figure 3:
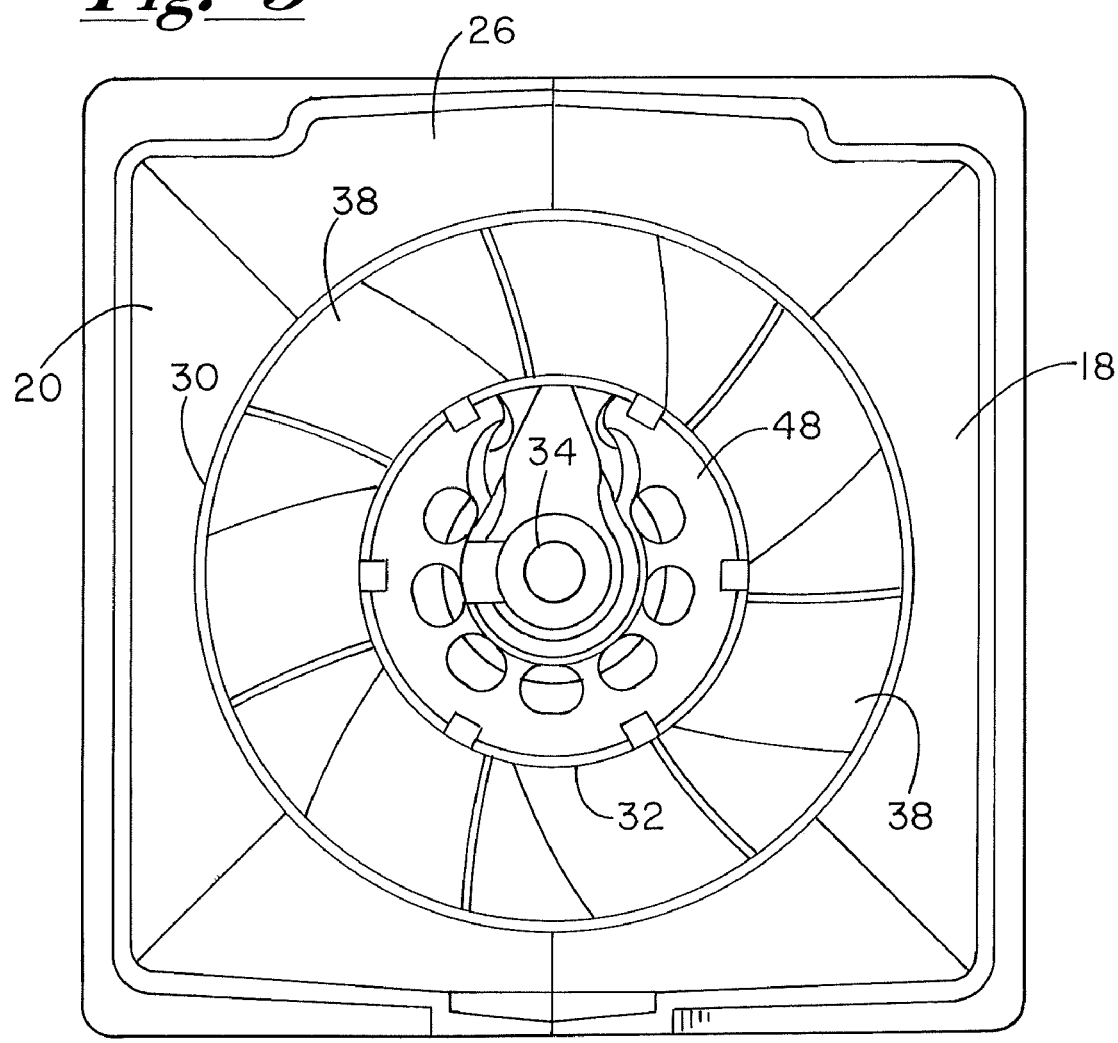
FIG. 3 is a rear elevation of the clamshell assembly.

As seen in FIG. 3, rearward or proximal end regions of clamshell sections 18 and 20 converge to a point of contact with a proximal end of outer housing section 30. An end cap 48 is mounted to inner housing section 32, surrounded by a proximal end region of the housing section. End cap 48 is shaped to provide a bearing seat to rotatably support shaft 34 through a proximal end bearing not visible in FIG. 3.

Figure 5:
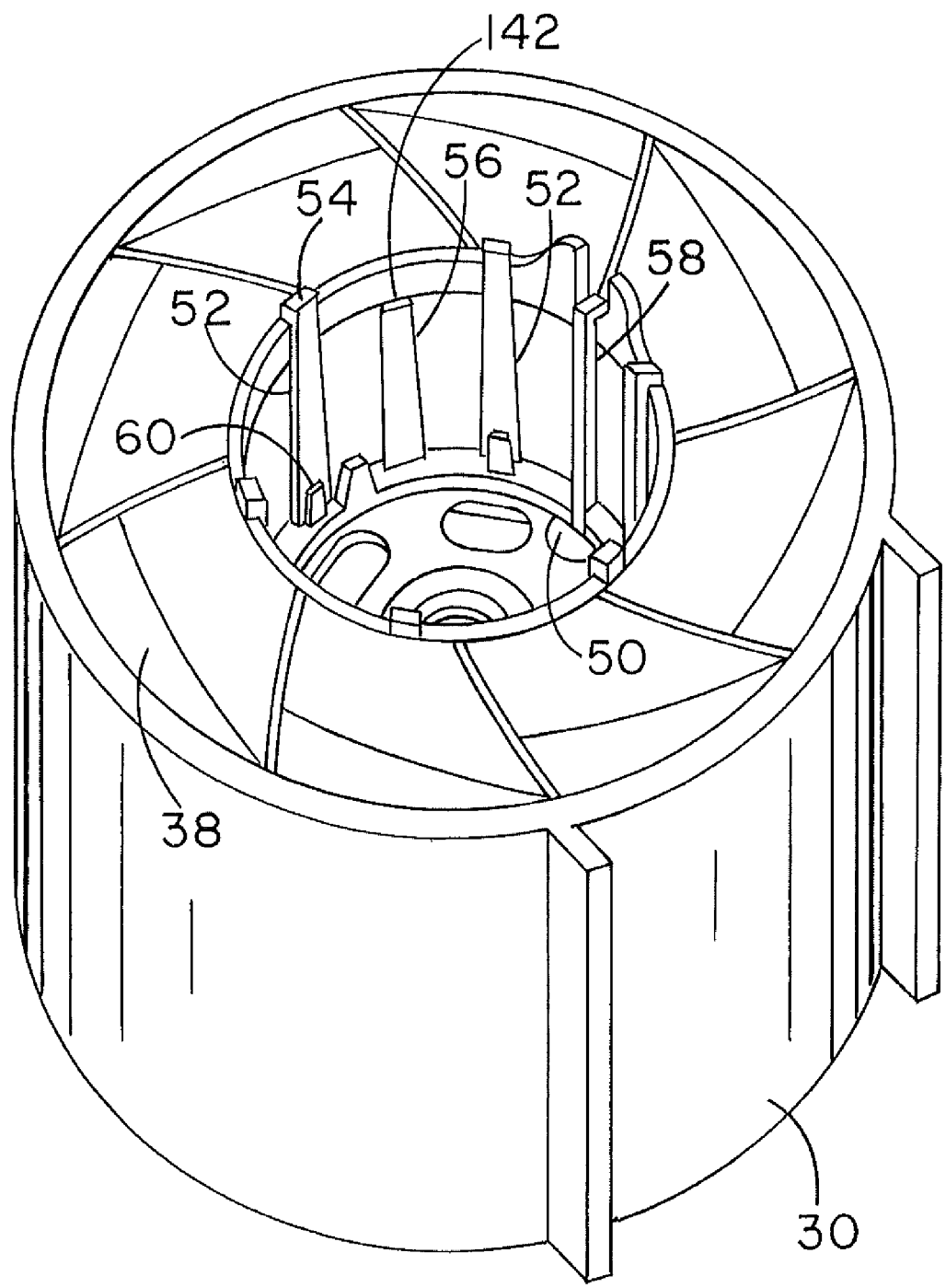
FIG. 5 is a perspective view of the motor housing.

With reference to FIG. 5, distal end section 36 includes several pads, one of which is shown at 50. Pads 50 are adapted to contact the distal end of a stator inserted into inner housing 32, to determine an axial position of the stator relative to the housing. A series of elongate ribs extend longitudinally along an interior surface of housing section 32. These include six ribs 52 having proximal end regions 54 that extend proximally beyond housing section 32, five recessed ribs 56 that terminate at a predetermined distance distally from the proximal end of housing section 32, and a single guide rib 58. Ribs 52 and 56 are disposed circumferentially about housing section 32 and in an alternating arrangement with guide rib 58 replacing one of ribs 56.

Preferably motor housing 28, including cylindrical housing sections 30 and 32, distal end section 36, and vanes 38, is formed as a single part or unitary structure of plastic, preferably polycarbonate, twenty percent glass filled. Due to the slight draft angle occasioned by the molding process, the interior surface of housing section 32, including the radially inward facing surfaces of ribs 52 and 56, are inclined to converge in the distal direction. In addition, each of ribs 52 is formed with a distal feature 60 with a radially inward facing surface inclined more steeply than the rest of the rib.

Figure 6:
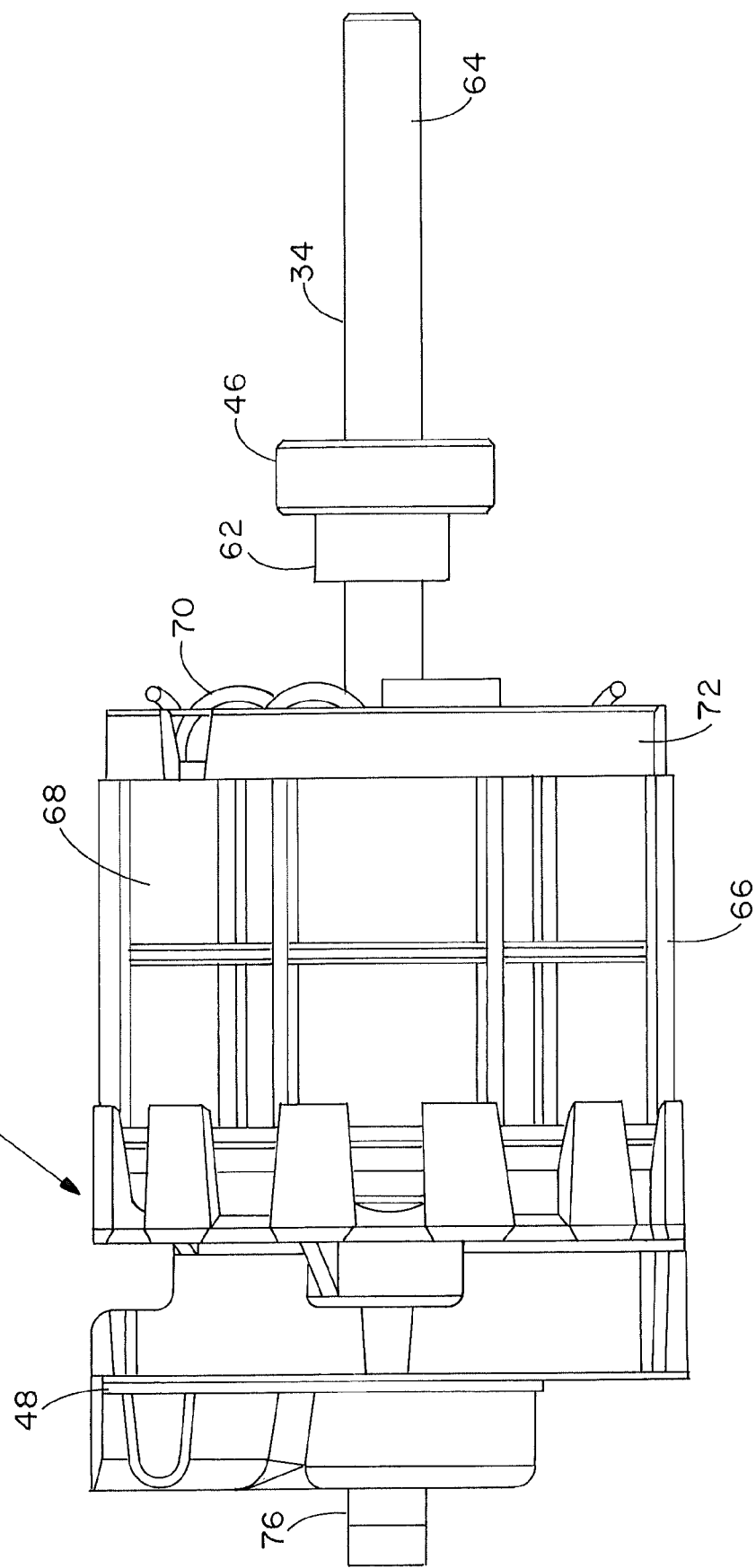
FIG. 6 is a side elevation of the motor and motor mounting components removed from the motor housing.

In FIG. 6, the motor housing is removed to more clearly show various motor components and mounting components contained in the housing. The motor components include rotor shaft 34, distal bearing 46, and a bushing 62 adjacent bearing 46. A distal region 64 of shaft 34 supports a fan blade, not shown. Shaft 34 is surrounded by a motor stator 66, having a cylindrical lamination stack 68, stator windings 70, and an inclined distal end region 72. A proximal end region of the stator is surrounded by a stator retaining ring 74.

End cap 48 is disposed proximally of retaining ring 74. A proximal end region 76 of rotor shaft 34 extends beyond end cap 48 in the proximal direction.

Figure 7:
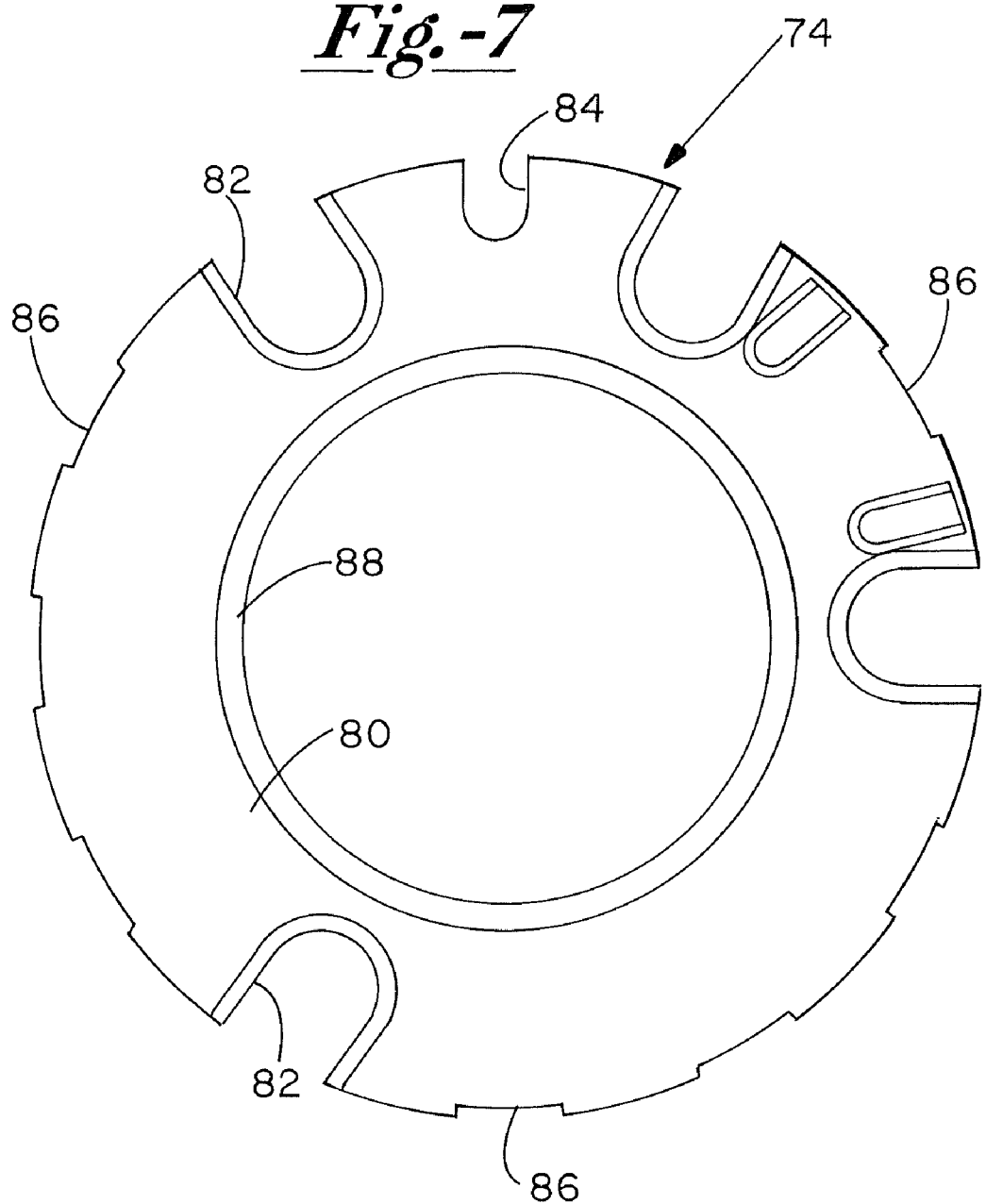
FIG. 7 is a rear elevation of a stator retainer.
Figure 8:
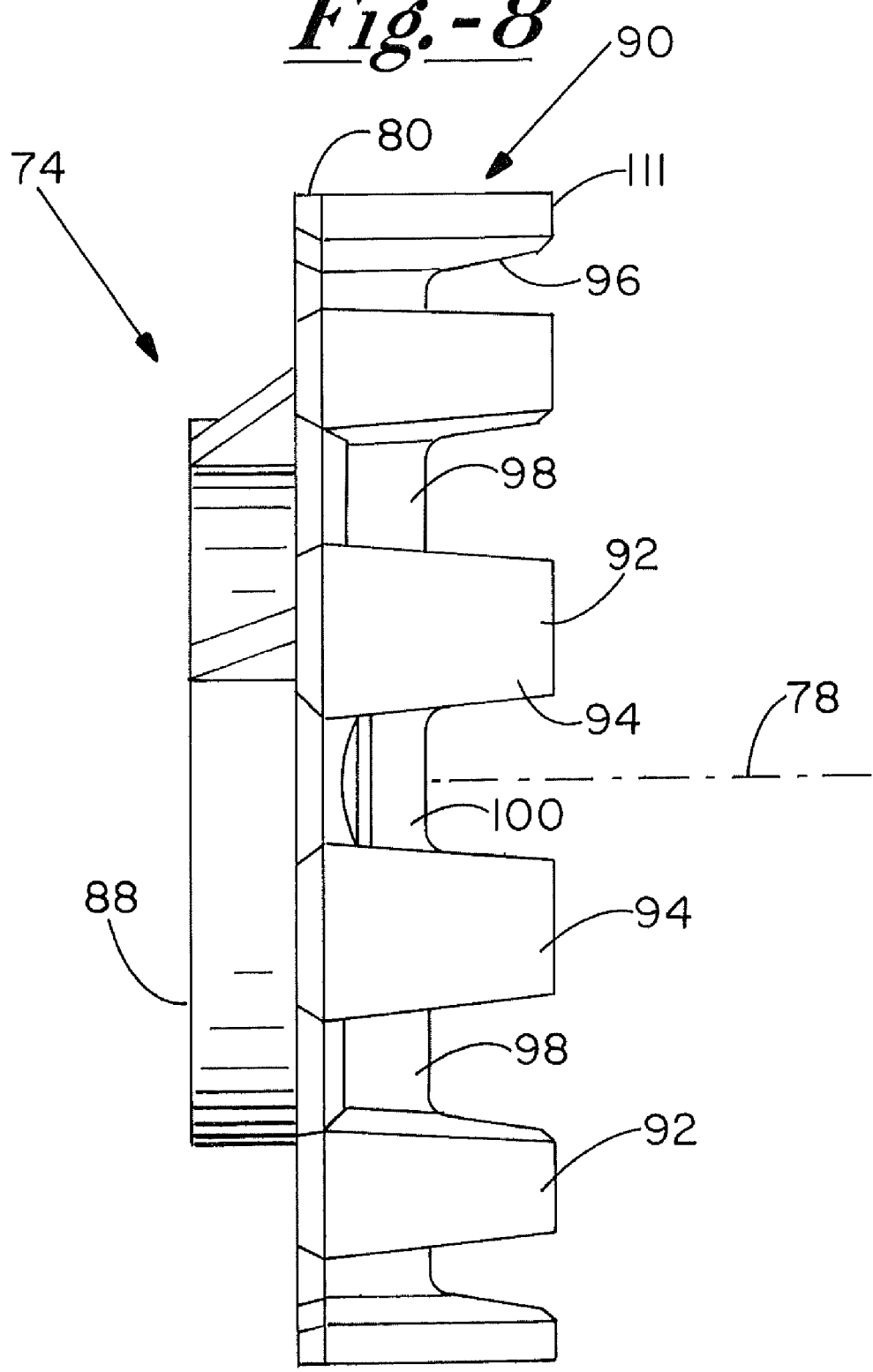
FIG. 8 is a side elevation of the stator retainer.
Figure 9:
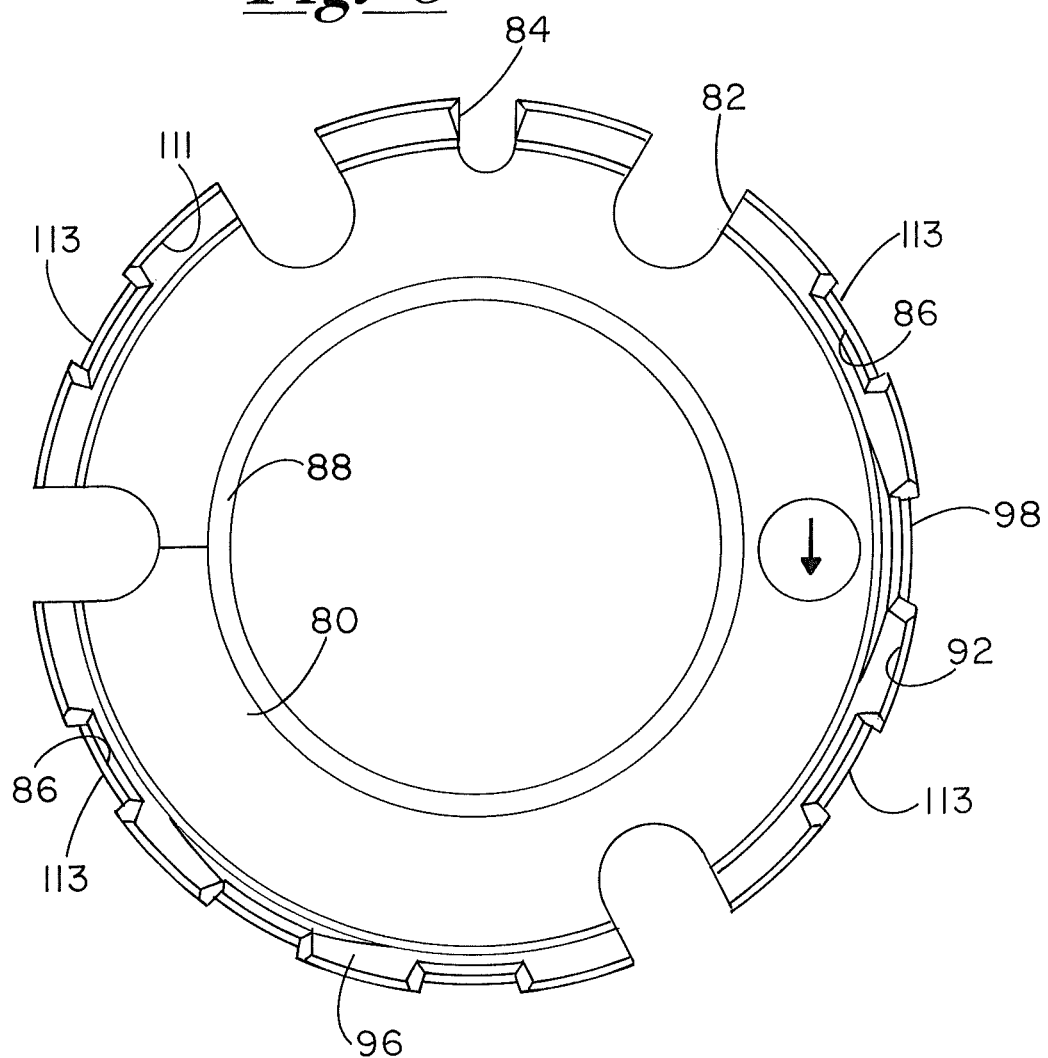
FIG. 9 is a frontal elevation of the stator retainer.

As seen in FIGS. 7-9, retaining ring 74 is an annular member centered on a retainer axis 78. The retaining ring has a substantially flat and annular platform 80 with circular outer and inner profiles centered on axis 78. Several relatively large and rounded recesses 82 extend radially inwardly from the outer profile and provide openings to accommodate wires that electrically couple the motor, primarily the stator widenings, to other components such as control circuitry and a power supply. A relatively narrow rounded recess 84 is used to key retaining ring 74 to a predetermined angular position when assembled into inner cylindrical housing section 32. The platform further includes several relatively shallow recesses 86. Considered together, recesses 82, 84, and 86 are spaced angularly about the periphery of platform 80, substantially uniformly in the sense that centers of adjacent recesses are spaced apart from one another approximately thirty degrees.

An annular sleeve 88 extends axially away from an inside edge of the platform, centered on the retainer axis. A stator centering structure 90 extends axially away from the outer peripheral edge of the platform, in the direction opposite to that of sleeve extension. In particular, when the retaining ring is mounted in a stator retaining position as shown in FIG. 6, sleeve 88 extends proximally from the platform while centering structure 90 extends distally.

The centering structure includes twelve stator centering and mounting features or fingers 92. Features 92 are arranged in angularly spaced apart relation about the platform periphery. Each centering feature is tapered to converge in the axial direction away from the platform, i.e. the distal direction when in use. More particularly, each feature 92 has a radially outward facing outside surface 94 that is curved in planes perpendicular to the retainer axis (e.g. FIG. 7) and inclined slightly to diminish the diameter of the retaining ring in the axial direction away from the platform, i.e. to the right as viewed in FIG. 8. An inside surface 96 of each feature is inclined somewhat more steeply from the axial direction, thus to provide in each centering feature a gradually reduced radial thickness in the axial direction away from the platform.

As best seen in FIGS. 8 and 9, the stator centering structure further includes several bridging sections 98 disposed between adjacent centering features in correspondence to recesses 86. The bridging sections have respective outside surfaces 100. Surfaces 100, like outside surfaces 94 of the centering features, are curved in planes perpendicular to the retainer axis and inclined to provide a diameter that gradually diminishes in the axial direction away from the platform.

Figure 10:
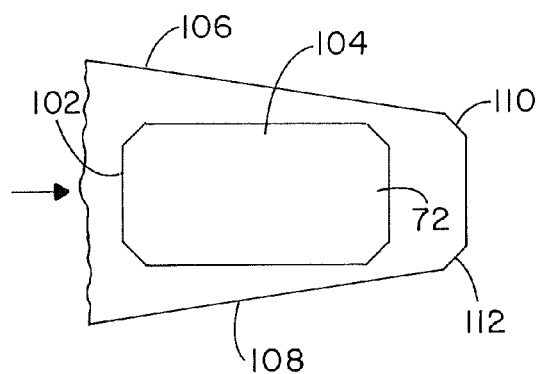
FIGS. 10 and 11 are schematic views illustrating the assembly of a stator into the motor housing.

A salient feature of the present invention resides in the selective shaping of inner cylindrical housing section 32 and retaining ring 74 to effect a preliminary radial centering of stator 66 responsive to an insertion of the stator into the housing section. This is shown in FIG. 10, where stator 66 and cylindrical housing section 32 are represented schematically, with certain angles exaggerated to more clearly illustrate the centering function. Stator 66 is substantially symmetrical, with an inclined proximal end region 102, distal end region 72, and a cylindrical medial region 104 over most of the stator length constituting a circular cylinder. Opposite gradually inclined surfaces 106 and 108 represent the inside, radially inwardly facing surfaces of two of ribs 52 spaced 180 degrees apart. The more steeply inclined sections 110 and 112 represent the inside surfaces of distal features 60. Distal end section 36 including pads 50 act as a stop to prevent further distal movement of the stator.

During motor assembly, stator 66 is inserted manually through the open proximal end and distally toward end section 36. Such insertion is bound to be imperfect, in the sense that the stator with respect to housing section 32 is offset angularly, offset radially, or both as distal region 72 approaches distal end section 36. Regardless of the nature of the offset, distal insertion brings the stator into contact with one of surfaces 106 and 108. Typically, initial contact occurs at a distal portion of medial region 104 adjacent the distal region 72. As stator 66 is moved distally after contact, the rib or ribs in contact with the stator urge the stator, particularly the distal end region, radially toward a more centered position within housing section 32. As continued distal insertion of stator 66 brings inclined region 72 into contact with pads 50, the radial centering action brings medial region 104 into contact with an increasing number of the ribs. Finally, as region 72 engages the pads, the distal end of medial region 104 is in contact with all of ribs 52 and 56, which cooperate to maintain the stator distal end region radially centered in relation to housing section 32. Distal features 60 are in contact with tapered region 72, to reinforce the centering action.

Another feature of the present invention resides in the manner in which retaining ring 74 engages cylindrical housing section 32 and stator 66 to axially mount the stator while simultaneously centering the proximal region of the stator within housing section 32 to complete the centering function. This feature is illustrated in FIG. 11, again with certain angles exaggerated to more clearly illustrate the function.

Retaining ring 74 is used to complete centering and mounting immediately after the initial insertion and centering illustrated in FIG. 10. Before insertion, retaining ring 74 is positioned with centering features 92 extending distally from platform 80. Also, the retaining ring is aligned angularly with housing section 32. With reference to FIGS. 5, 7, and 9, recess 84 of ring 74 is at least substantially aligned with rib 58, with the retainer axis approximately coincident with the longitudinal axis. This serves to align recesses 82 and 86 with ribs 52 and 56. With particular attention to shallow recesses 86 and the individual ones of ribs 52 and 56 with which these recesses are aligned, the ribs/recess interaction serves to positively maintain the desired angular alignment.

The desired angular alignment positions outside surfaces 94 of centering features 92 in confronting relation to the interior surface of cylindrical housing section 32. It also positions each of outside surfaces 100 of bridge sections 98 in confronting relation to the inside surface of an associated one of ribs 52 and 56. All of these surfaces are inclined radially inwardly in the distal direction.

Inside surfaces 96 of the centering features are oppositely inclined, i.e. radially outward in the distal direction. Further, inside surfaces 96 are inclined more steeply than outside surfaces 94 to accommodate proximal inclined region 102 of stator 66. The angle between each pair of surfaces 94 and 96 is greater than the angle between the stator and the interior surface of housing section 32, to promote a wedging action upon the housing section and stator by each of the centering features as retaining ring 74 is moved distally into the housing section.

Figure 11:
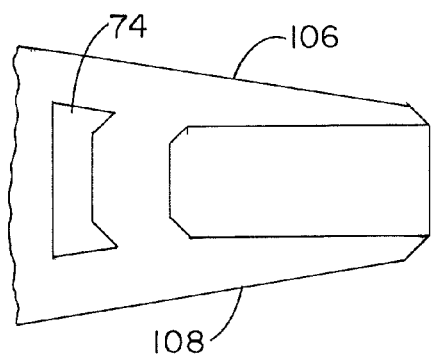

As seen in FIG. 11, placement of retaining ring 74 is initiated by inserting the ring distally through the proximal opening of cylindrical housing section 32, with centering features 92 extending distally, with retainer axis 78 and the housing axis at least approximately coincident, and with the retaining ring at least approximately angularly aligned with the housing section. As distal manual insertion continues, platform 80 encounters ribs 52. Aligning the recesses with their associated rib proximal ends 54 may or may not require slight rotation of the retaining ring. In either event, the entry of ribs into the associated recesses positions ring 74 in the desired angular alignment for further distal insertion, which causes rib 58 to enter recess 84.

As the retaining ring is inserted further, distal edges 111 of centering features 92 enter the annular gap between the interior surface of housing section 32 and the stator exterior surface. At this stage, the proximal end of stator 66 may or may not be centered within cylindrical housing section 32, and retaining ring 74 likewise may or may not be centered. However, should the retaining ring be radially offset from the housing section, one or more of centering features 92 engages the interior housing surfaces, after which further distal insertion of the ring tends to center the ring due to the incline of the interior surface. Similarly, assuming that the proximal end of stator 66 is radially offset from a centered position, distal movement of the centering ring causes one or more of inside surfaces 96 of the centering features to engage the stator exterior surface. Due to the incline of the inside surfaces 96, further distal movement of the retaining ring urges the proximal region of the stator radially toward centering.

In short, there is a compound effect of housing and retaining ring interacting to drive the retaining ring towards centering while ring and stator surfaces interact to drive the stator towards centering. Alternatively, this can be thought of as a wedging action of each centering feature between stator and housing surfaces to center the stator.

When the radial thickness of centering features 92 fills the radial width of the gap between the stator and housing surfaces, retaining ring 74 is in its stator retaining position and cannot be moved further in the distal direction. At this point the stator, retaining ring, and housing section are in a frictional engagement which tends to keep the stator axially and radially fixed within the housing. To permanently secure the stator, retaining ring 74 is fixed in the stator retaining position by permanently attaching it to housing section 32. This is accomplished by bonding the stator centering structure to the interior surface of the housing section. In one advantageous arrangement, outside surfaces 100 of the bridging sections and contacting portions of ribs 56 are bonded together by sonic welding at four locations designated 113 in FIG. 9.

This approach to bonding, along with the shapes of the components involved, provide several advantages that considerably reduce the cost and time of assembly. The components are self centering. There is no need for additional fixtures or jigs to align the parts for assembly. The use of spaced apart, circumferentially arranged centering features advantageously allows for localized elastic deformation of individual centering features without undesirably affecting the centering process. In addition, the spaced apart centering features and recessed bridging sections, in combination with the ribs formed along the cylindrical housing interior surface, more positively set the desired angular alignment. This arrangement has been found to provide an additional benefit, in that movement of a centering ring into the stator retaining position causes the centering features on each side of a bridging section to elastically deform in a manner that more positively presses outside surfaces 100 against the inside surfaces of the adjacent ribs, resulting in a more reliable sonic weld.

Figure 12:
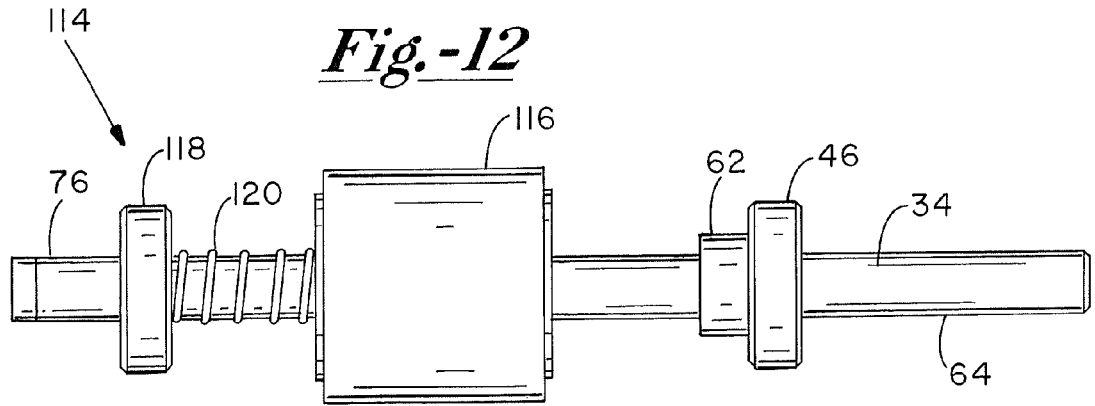
FIG. 12 is a side view of a rotor separate from the other components shown in FIG. 6.

Once stator 66 is centered and secured, motor assembly continues with insertion of the rotor into housing 32, with a rotational axis of the rotor coincident with the housing axis. FIG. 12 shows a rotor 114, positioned as in FIG. 6 but with the other components removed. The rotor includes shaft 34 and a rotor magnet and backiron assembly 116 mounted integrally to the shaft. On opposite sides of assembly 116 are a proximal bearing 118 and distal bearing 46. A compression spring 120 is mounted between bearing 118 and assembly 116, and a bushing 122 is mounted to the shaft adjacent distal bearing.

Rotor 114 is supported by distal end housing section 36 and end cap 48, which incorporate respective distal and proximal bearing seats engaged with bearings 46 and 118, respectively to support the rotor for rotation about a longitudinal rotor axis.

Figure 14:
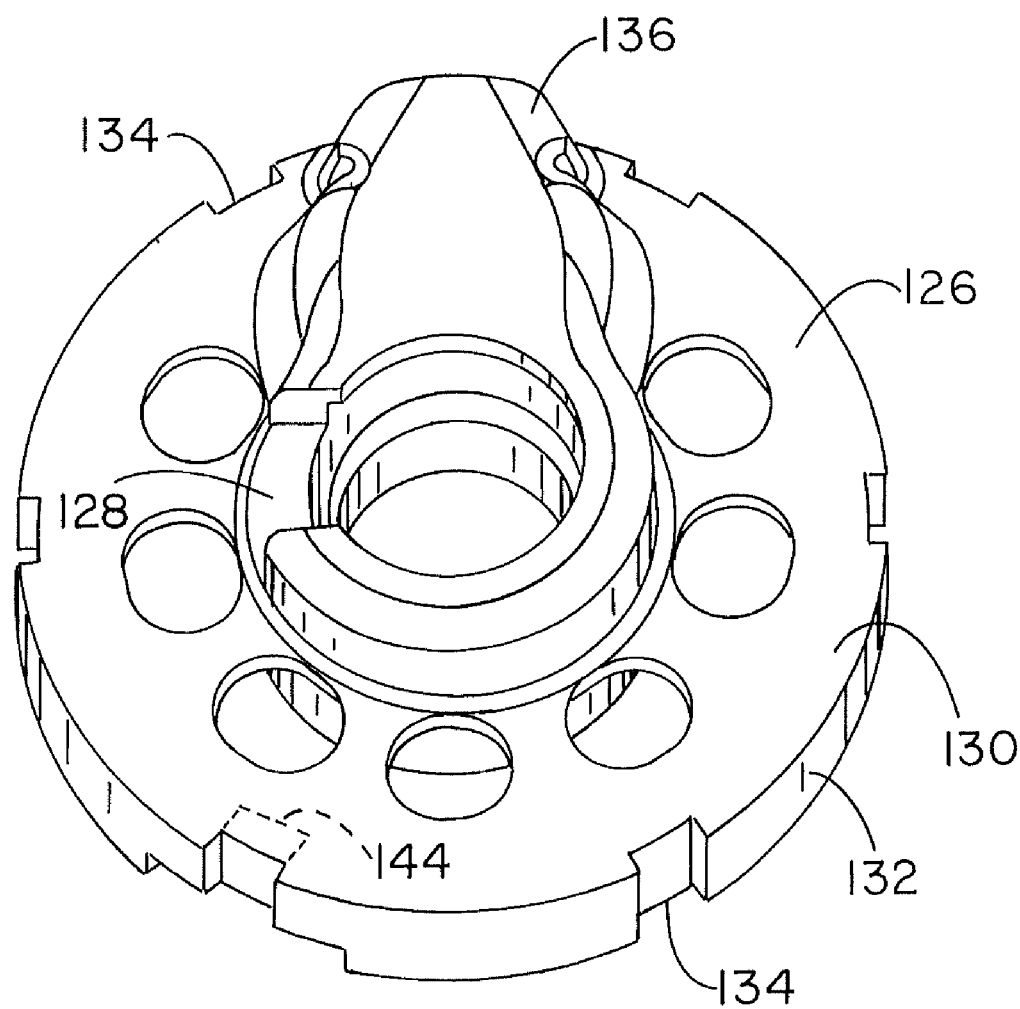
FIGS. 14 and 15 are perspective views illustrating outer and inner surfaces of the end cap, respectively.

FIG. 14 shows an outer side of end cap 48, i.e. the proximal side of the end cap when in a rotor retaining location as shown in FIG. 6.

End cap 48 has a unitary body formed of metal, preferably an alloy of zinc, aluminum, magnesium, and copper available under the name "Zamac 5." The body, centered about an end cap axis 124 includes an annular platform section 126, an annular inner section 128 surrounding a central axial opening through the body, and an outer peripheral section 130 surrounding the platform section. The peripheral section has an annular outer surface 132 that extends away from platform section 126 in a substantially axial direction, but with a slight incline to provide an end cap diameter that diminishes in the direction away from the platform. Outer surface 132 is interrupted by six recesses or notches 134 angularly spaced apart from one another about the peripheral section. Each of recesses 134 is adapted to accommodate one of ribs 52 as end cap 48 is inserted distally into cylindrical housing section 32. Adjacent recesses are spaced apart angularly by about sixty degrees. A wire guide structure 136 extends away from platform section 126, on the opposite side of the platform from peripheral section 130. As seen in FIG. 6, when the end cap is in use, the wire guide is on the proximal side while the peripheral section extends distally away from the platform.

Figure 13:
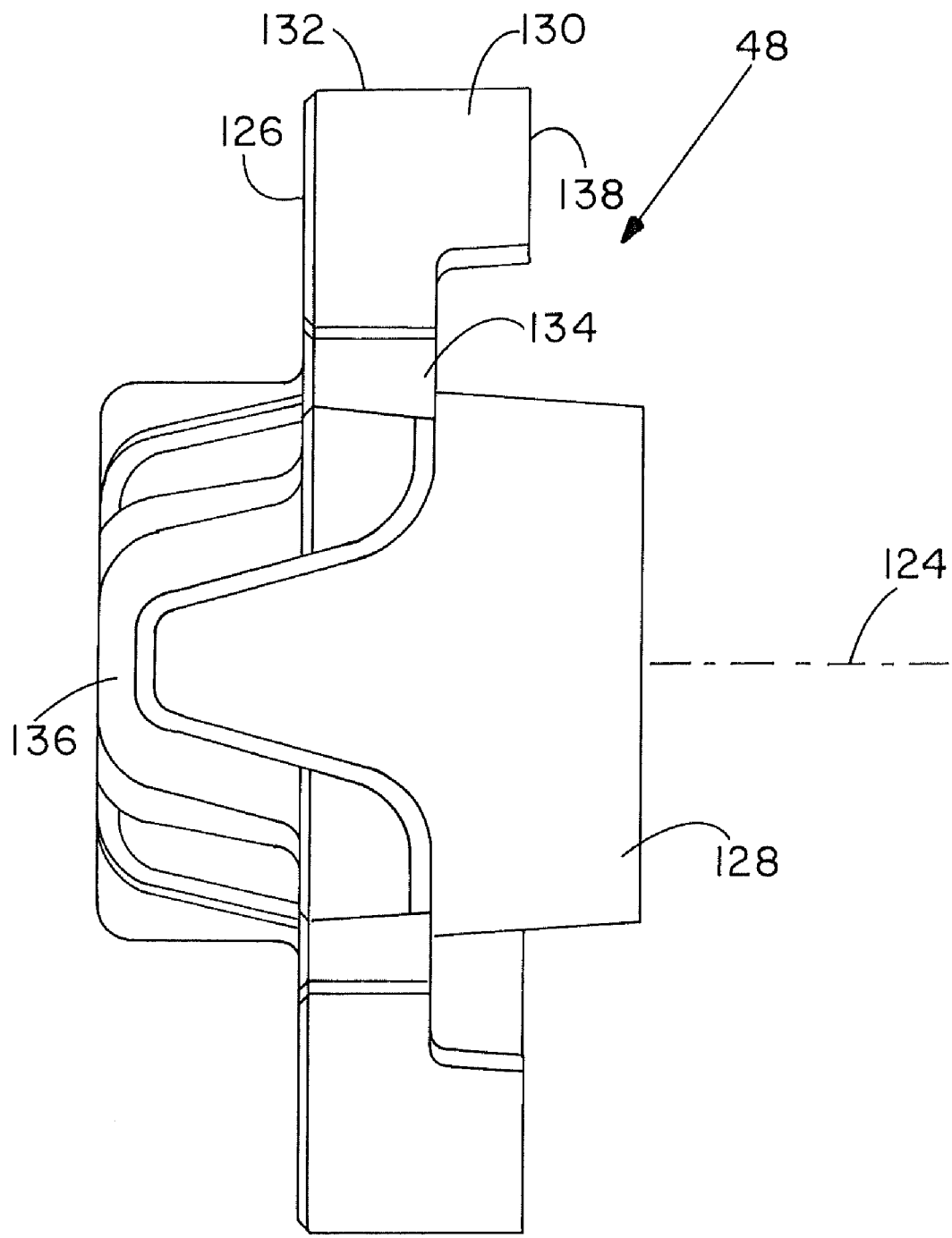
FIG. 13 is a top plan view of a rotor retaining end cap.

Peripheral section 130 includes an acuate, generally annular peripheral edge 138 remote from the platform and occupying a plane perpendicular to the end cap axis. Peripheral edge 138 occupies the majority of the peripheral section circumference, with several discontinuities such as an opening associated with wire guide structure 136, as seen in FIG. 13. During insertion of end cap 48 into cylindrical housing 32 to the rotor retaining position shown in FIG. 6, peripheral edge 138 functions as a leading distal edge of the peripheral section. Peripheral edge 138 cooperates with a detent feature of housing section 32, to determine an axial location of the end cap within the housing section.

Figure 15:
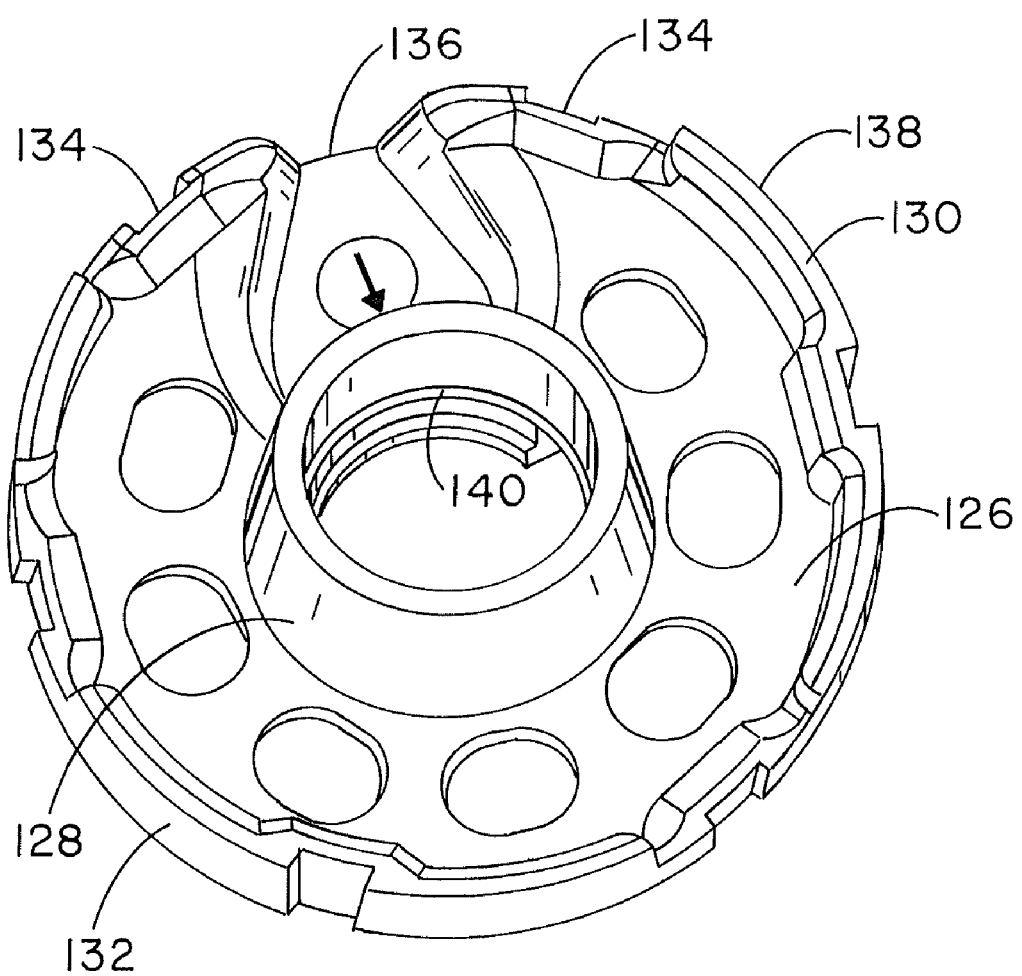

End cap 48 incorporates a bearing seat centered on axis 124, adapted to engage proximal end bearing 118 to rotatably support shaft 34. As best seen in FIG. 15, annular inner section 128 defines a circular opening, which has a profile slightly larger than a profile of the bearing to slideably receive the bearing. An annular shoulder 140 extending radially inwardly from an inside surface of inner section 128, functions as a stop to determine the axial location of the proximal end bearing relative to the inner section while leaving an opening of sufficient size to accommodate shaft 34.

Cylindrical housing section 32 incorporates features adapted to automatically effect centering of rotor 114 as the rotor is assembled into the housing section. These include features that act directly upon the rotor assembly, independently of end cap 48. With reference to FIG. 4, examples include longitudinally extending sleeve 40 and fixture elements 42 surrounding the sleeve, which cooperate to radially and axially confine distal bearing 46. These features radially center distal region 64 of the rotor shaft, and provide a distal stop that prevents further distal travel of the shaft relative to housing section 32.

Other features of housing section 32 cooperate with features of end cap 48 to properly position the rotor. As to radial centering, the inclined interior housing surface, particularly that portion near the proximal end of the cylindrical housing section, is disposed for surface engagement with annular outer surface 130 of the end cap as the end cap is inserted distally into the housing section. As the end cap is inserted further, following engagement, the interior surface provides a camming action that urges the end cap radially toward the centered position. Simultaneously, the entry of proximal bearing 118 into the bearing seat formed by inner section 128 and shoulder 140 radially centers the rotor shaft within the end cap.

Similarly, cylindrical housing section 32 and end cap 48 cooperate to axially position the rotor. With reference to FIG. 5, proximal ends 142 of recessed ribs 56 occupy a plane perpendicular to the housing axis. Thus, ribs 56 cooperated to form a detent feature at a selected axial location along the interior surface. Proximal ends 142 are positioned to contact peripheral edge 138 of the end cap and determine an axial rotor retaining position of the end cap by preventing further distal insertion. At the same time, shoulder 140 determines the axial location of proximal end bearing 118 with respect to the end cap. Accordingly, these features cooperate to determine the axial location of the rotor relative to cylindrical housing section 32. This result is facilitated by carefully selecting the longitudinal distance between free ends 44 of the fixtures and proximal ends 142 of ribs 56, and the axial or longitudinal distance between peripheral edge 138 and shoulder 140 of the end cap.

Rotor 114 is assembled into cylindrical housing section 32 with stator 66 and stator retaining ring 74 already in place. The rotor assembly is inserted into housing section 32 through the open proximal end, and moved distally until distal end of shaft 34 passes through the central opening in sleeve 40, and further until distal end bearing 46 enters the sleeve. This centers the distal end region of the shaft. Further distal travel brings bearing 46 into contact with the free ends of fixtures 42, to axially position the rotor. At this stage, end cap 48 is inserted distally into housing section 32. This is a manual insertion, with end cap axis and at least approximately aligned with the housing axis, and with the end cap at least approximately at a desired angular position relative to the housing section. As insertion continues, peripheral edge 138 and a distal portion of peripheral section 130 enter housing section 32, and regions of the peripheral section near recesses 134 encounter proximal end regions 54 of ribs 52. At this stage, the end cap may be rotated about the end cap axis slightly if necessary to align the recesses and ribs.

Alignment allows further distal insertion of the end cap, effecting the interaction of the housing and end cap surfaces to center end cap 48 radially relative to housing section 32, and locating proximal end regions 54 of ribs 52 proximally of platform section 126. Insertion continues until peripheral edge 138 contacts the detent feature of housing section 32, i.e. the proximal ends of ribs 56. Simultaneously, end cap insertion moves inner section 128 distally into its surrounding relation to proximal end bearing 118, eventually bringing shoulder 146 into engagement with the bearing. This locates end cap 48 at the rotor retaining position relative to the housing section.

At this stage, end cap 48 is fixed to cylindrical housing section 32 to permanently retain the rotor assembly. Fixation is accomplished with a heat staking process in which the rib material at proximal ends 54 is caused to flow onto platform section 126. As a result, the proximal end regions overlie the platform section in close surface contact, to secure the end cap against proximal movement relative to housing section 32.

Broken lines at 144 in FIG. 14 indicate an approximate area of surface contact over which a reshaped proximal end region 54 contacts platform section 126. Although the surface area is not necessarily rectangular as depicted, one aspect of the present invention is that the heat staking process is controlled to prevent the rib material from flowing radially outwardly of peripheral section 130. This is accomplished with a heat staking tool configured to confine plastic flow to a generally radially inward direction as heat is applied to the proximal ends of ribs 52. The result, as shown in FIG. 3, is that the smooth circular outer profile of housing section 32 is maintained. None of the rib material extends radially outwardly beyond the housing section.

This results in a more efficient air flow through the annular passage between cylindrical housing sections 30 and 32, which in turn leads to more efficient cooling of the heat generating electrical components.

With respect to mounting stator 66, several advantages were noted above as to cylindrical housing 32 and its interaction with retaining ring 74. With respect to mounting the rotor, the interaction of housing section 32 and end cap 48 likewise affords these advantages. Due to the self centering character of the components, there is no need for fixtures or tooling to keep the rotor in a centered position as it is assembled into the housing. Similarly there is no need for tooling to center the proximal end of the rotor assembly, because end cap insertion inherently centers the proximal end bearing and related portion of the rotor shaft. The heat staking process eliminates the need for screws or other auxiliary fasteners, and is accomplished in a manner that preserves the smooth outer periphery of the cylindrical housing section, for more effective air flow. In addition, features of the housing section and end cap cooperate to positively axially place the rotor assembly, again without added fixtures or tooling.

Thus in accordance with the present invention, motor components can be assembled into a housing in a manner that considerably reduces the time, tooling, and skill required, and at the same time provide more reliable and repeatable axial positioning and radial centering of motor components.

What is claimed is:

1. A motor stator mounting device, including:
    a motor housing disposed about a longitudinal housing axis, the housing including a cylindrical housing section centered on the housing axis and having a proximal end, a distal end, and an interior surface region between the proximal and distal ends and inclined to gradually converge in a distal direction, the housing further including a transversely oriented distal end housing section integral with the cylindrical housing section; and
    a stator retaining member having an annular platform centered on a retainer axis and a stator centering component disposed circumferentially about the platform, extending away from the platform in a selected direction parallel to the retainer axis, and tapered to provide a decreasing radial thickness in the selected direction;
    wherein the proximal end is open to receive a cylindrical motor stator for a distal insertion into the cylindrical housing section toward a selected axial location in which a distal end of the stator engages the distal end housing section, and the interior surface region is adapted to engage the stator during said distal insertion and urge a distal end region of the stator radially toward a centering about the housing axis responsive to said distal insertion, thus to substantially center the stator distal end region within the housing;
    wherein the stator retaining member is insertable distally into the cylindrical housing following said distal insertion of the stator, with the retainer and housing axes substantially coincident and with the centering component directed distally of the platform, to locate the centering component radially between the interior surface region and an exterior surface region of the stator near a proximal end thereof, wherein movement of the retaining member distally toward a stator retaining position produces a wedging action of the centering component against said interior and exterior surface regions, tending to center the proximal end of the stator on the housing axis while positioning the stator at the selected axial location; and wherein the stator retaining member is adapted for an attachment to the housing while in the retaining position, to permanently fix the stator.

2. The device of claim 1 wherein:

the cylindrical housing section comprises a tubular wall and a plurality of ribs extending longitudinally along an inside surface of the tubular wall, wherein the interior surface region comprises radially inward surfaces of the ribs.

3. The device of claim 2 wherein:

the ribs include a plurality of first ribs having proximal end portions extending proximally beyond the proximal end of the cylindrical housing section.

4. The device of claim 3 further including:

a plurality of second ribs extending longitudinally along said inside surface and recessed distally from the proximal end of the cylindrical housing section by a predetermined distance whereby the second ribs cooperate to provide a reference surface.

5. The device of claim 2 wherein:

the retaining member comprises a plurality of recesses arranged peripherally about the platform, wherein each of the recesses is adapted to accommodate one of the ribs to determine an angular position of the retaining member relative to the cylindrical housing section.

6. The device of claim 2 wherein:

each of the inside surfaces of the ribs is inclined with respect to the housing axis by a first angle over a majority of the rib length, and inclined by a second angle larger than the first angle over a distal end portion of the rib length.

7. The device of claim 2 wherein:

a selected one of the ribs has a unique transverse profile, and the retaining member comprises a slot formed along a perimeter of the platform and having a transverse profile corresponding to the selected rib and adapted to cooperate with the selected rib to determine an angular position of the retaining member relative to the cylindrical housing section.

8. The device of claim 1 wherein:

the centering component comprises a plurality of centering features arranged circumferentially about the platform in spaced apart relation to one another with each centering feature extending away from the platform in the selected direction.

9. The device of claim 8 wherein:

the centering component further comprises a plurality of radially outward facing retainer surface regions adapted for surface engagement with the internal surface region when the retaining member is in the stator retaining position; and the attachment of the retaining member to the housing comprises a plurality of welds, one of the welds at each retainer surface region.

10. The device of claim 1 wherein:

the housing further comprises a tubular outer housing section surrounding the cylindrical housing section and centered on the housing axis, and a plurality of vanes joined to the cylindrical housing section and the outer housing section to integrally couple the housing sections and guide a flow of air through an annular space between the housing sections.

11. The device of claim 10 wherein:

the cylindrical housing section, the distal end section, the outer housing section and the vanes together comprise a single unitary structure.

12. The device of claim 1 wherein:

the distal end section is open at a center thereof to accommodate a first bearing mounted on a rotor shaft, thereby to support the shaft for rotation relative to the housing about the housing axis;

the retaining member is open at a center thereof to accommodate the rotor shaft.

13. The device of claim 12 further including:

a rotor support member comprising a bearing seat and adapted for a mounting with respect to the proximal end of the cylindrical housing section at a predetermined axial position and substantially centered on the housing axis, with the support member accommodating a second bearing mounted along the rotor shaft to rotatably support the shaft relative to the housing.

14. A process for assembling a motor stator into a motor housing, including:

providing a motor housing comprising a cylindrical housing section disposed about a longitudinal housing axis, open at a proximal end thereof and having a transversely oriented housing end section at a distal end thereof, wherein an interior surface region between the proximal and distal ends is inclined to converge gradually in the distal direction;

inserting a cylindrical motor stator into the cylindrical housing section through the open end and moving the stator distally toward the distal end section to effect a sliding surface engagement of a distal end region of the stator with the interior surface region;

after effecting said engagement, moving the stator distally toward a selected axial location in contact with the distal end section while said sliding surface engagement tends to center the distal end region of the stator about the housing axis;

with the stator at the selected axial location, moving a stator retaining member distally into a stator retaining position with a distally converging centering component of the retaining member disposed radially between the interior surface and an exterior surface of a proximal end region of the stator, to substantially center the proximal end region on the housing axis; and with the retaining member in the stator retaining position, fixing the retaining member to the cylindrical housing section to positionally fix the stator.

15. The process of claim 14 wherein:

moving the stator retaining member distally into the stator retaining position comprises selecting an angular position of the retaining member with respect to the cylindrical housing section.

16. The process of claim 14 wherein:

moving the retaining member distally into the stator retaining position comprises locating the retaining member inside the cylindrical housing section.

17. The process of claim 14 wherein:

fixing the retaining member to the cylindrical housing section comprises bonding an exterior surface region of the retaining member to the interior surface region.

18. The process of claim 17 wherein:

bonding the exterior surface region to the interior surface region comprises forming a plurality of sonic welds at selected locations where the exterior surface region is in surface contact with the interior surface region.

19. The process of claim 14 further including:

after positionally fixing the stator, inserting a rotor shaft distally into the cylindrical housing section through an opening in the retaining member and further through an opening in the distal end section, to a predetermined axial location in which a first bearing mounted to the rotor shaft engages a first bearing seat formed in the distal end section;

after so inserting the rotor shaft, inserting an annular rotor support member distally through the open end and into the cylindrical housing section to a predetermined axial location, to bring a bearing seat of the rotor support member into an engagement with a second bearing mounted to and surrounding the rotor shaft and spaced apart axially from the first bearing;

centering the rotor support member on the housing axis; and with the rotor support member at the rotor retaining location and centered, integrally fixing the support member with respect to the cylindrical housing section.

* * * * *